(12) United States Patent
Landry

(10) Patent No.: US 10,516,774 B2
(45) Date of Patent: Dec. 24, 2019

(54) METHOD FOR CONFIGURING A WIRELESS DEVICE

(75) Inventor: Lawrence B. Landry, Victor, NY (US)

(73) Assignee: Apple Inc., Cupertino, CA (US)

( * ) Notice: Subject to any disclaimer, the term of this patent is extended or adjusted under 35 U.S.C. 154(b) by 1097 days.

(21) Appl. No.: 13/369,327

(22) Filed: Feb. 9, 2012

(65) Prior Publication Data

US 2013/0212233 A1 Aug. 15, 2013

(51) Int. Cl.
  *G06F 15/177* (2006.01)
  *H04M 1/725* (2006.01)
  *H04L 12/24* (2006.01)
  *H04W 4/50* (2018.01)

(52) U.S. Cl.
  CPC ...... *H04M 1/7253* (2013.01); *H04L 41/0803* (2013.01); *H04M 2250/02* (2013.01); *H04M 2250/06* (2013.01); *H04W 4/50* (2018.02)

(58) Field of Classification Search
  CPC ........... H04M 1/7253; H04M 2250/02; H04W 4/001; H04L 41/0803
  See application file for complete search history.

(56) References Cited

U.S. PATENT DOCUMENTS

| | | | |
|---|---|---|---|
| 8,831,517 B2 * | 9/2014 | Shankaranarayanan | H04L 12/1475 455/41.2 |
| 8,959,187 B2 * | 2/2015 | Li et al. | 709/220 |
| 9,681,476 B2 * | 6/2017 | Qi | H04W 76/18 |
| 2007/0015463 A1 * | 1/2007 | Abel | H04B 5/0031 455/41.1 |
| 2007/0024895 A1 * | 2/2007 | Clark | G06F 3/1204 358/1.15 |
| 2007/0047524 A1 * | 3/2007 | Moriya | 370/352 |
| 2007/0140189 A1 * | 6/2007 | Muhamed | H04W 48/14 370/338 |
| 2008/0026745 A1 | 1/2008 | Grubb | |
| 2009/0197584 A1 | 8/2009 | Snow | |
| 2009/0207042 A1 | 8/2009 | Park | |
| 2010/0026816 A1 * | 2/2010 | Bergstrom et al. | 348/207.11 |
| 2010/0111055 A1 * | 5/2010 | Chiu | H04W 24/02 370/338 |
| 2010/0115146 A1 * | 5/2010 | Roth et al. | 710/11 |
| 2010/0253507 A1 | 10/2010 | Jung et al. | |
| 2010/0311330 A1 * | 12/2010 | Aibara | H04W 36/0055 455/41.2 |
| 2011/0099264 A1 * | 4/2011 | Chapin et al. | 709/224 |
| 2011/0151788 A1 * | 6/2011 | Castrogiovanni | H04W 76/23 455/41.2 |

(Continued)

*Primary Examiner* — Mohamed Ibrahim
(74) *Attorney, Agent, or Firm* — Blank Rome LLP

(57) ABSTRACT

A method for configuring a first electronic device that includes first and second wireless communication systems. A first wireless connection is established between the first electronic device and a second electronic device using the first wireless communication system. Configuration information pertaining to the second wireless communication system is transmitted from the first electronic device to the second electronic device using the first wireless connection. Configuration instructions are transmitted from the second electronic device to the first electronic device over the first wireless connection. The configuration instructions are used to configure the first electronic device to communicate using the second wireless communication system, and the first wireless connection can then be terminated.

20 Claims, 5 Drawing Sheets

(56) References Cited

U.S. PATENT DOCUMENTS

| | | | |
|---|---|---|---|
| 2011/0183620 A1* | 7/2011 | Eisenbach | H04M 1/7253 |
| | | | 455/41.2 |
| 2011/0242335 A1 | 10/2011 | Tan | |
| 2011/0243033 A1 | 10/2011 | Won | |
| 2011/0314139 A1* | 12/2011 | Song | H04L 67/14 |
| | | | 709/223 |
| 2012/0079100 A1* | 3/2012 | McIntyre et al. | 709/224 |
| 2013/0016848 A1* | 1/2013 | Warren | H04R 27/00 |
| | | | 381/77 |
| 2013/0073601 A1* | 3/2013 | Jenkins et al. | 709/201 |
| 2013/0120596 A1 | 5/2013 | Yau | |
| 2013/0165075 A1* | 6/2013 | Rishy-Maharaj | H04W 12/04 |
| | | | 455/411 |
| 2016/0027295 A1 | 1/2016 | Raji | |

* cited by examiner

METHOD FOR CONFIGURING A WIRELESS DEVICE

CROSS-REFERENCE TO RELATED APPLICATIONS

Reference is made to commonly assigned, co-pending U.S. patent application Ser. No. 13/369,328, filed Feb. 9, 2012, entitled: "Wireless Security Camera System," by Landry, which is incorporated herein by reference.

FIELD OF THE INVENTION

This invention pertains to the field of wireless electronic devices and more particularly to a method for configuring a wireless electronic device that does not include a user interface.

BACKGROUND OF THE INVENTION

Wireless communication systems allow communication between devices in a convenient manner. Since the data in a wireless communication system is broadcast through air, it is possible for unwanted, nearby electronic devices to receive any transmission between other electronic devices. Significant progress has been made to ensure the security of wireless communications connections utilizing secure communications protocols including, but not limited to, device pairing, Wired Equivalent Privacy (WEP), Wi-Fi Protected Access (WPA), and Advanced Encryption Standard (AES). Utilizing these (or other) secure communications protocols, electronic devices can establish a secured wireless communication system where data can be exchanged between properly configured wireless communication devices.

To ensure the security, these secure communications protocols require an initial configuration step for each electronic device connected to the secured wireless communication system during which specific security values are stored on each electronic device as required by the secured wireless communication system. The stored values can include encryption keys and other security related data. Due to security issues, this configuration process cannot be performed over the same secured wireless communication system. For devices that have a user interface display and user interface input controls (e.g., wireless-enabled computer, digital picture frames or smart phones), the display, entry and selection of configuration values can be performed with the user interface display and input controls on the device itself. For devices without sufficient user interface capabilities, some other mechanism must be used to enter configuration parameters.

A number of different methods of initial configuration are prevalent in the field today. FIG. 1 shows one such method of configuring a first electronic device 101 from a second electronic device 105 using a wired communication system 108 such as a Universal Serial Bus (USB) connection or an Ethernet connection. The use of the wired communication system 108 avoids many of the security issues associated with wireless communications, as the data is not broadcast over the air. The second electronic device 105 connects to the first electronic device 101 via the wired communication system 108 using standard protocols associated with the wired communication system 108. A device configuration application running on the second electronic device 105 then sends commands and data across the wired communication system 108 to the first electronic device 101. The first electronic device 101 is capable of interpreting the commands and data received over the wired communication system 108, processing those commands and data, and returning appropriate responses over the wired communication system 108. The returned responses can include information indicating an internal state of the first electronic device 101, information obtained by the first electronic device 101 (e.g. wireless communication systems 103 that were located), and result codes for the commands received from the second electronic device 105 via the wired communication system 108.

The device configuration application running on the second electronic device 105 displays information to a user via a display 107. The user can indicate selections, enter values and control the device configuration application via one or more user controls 106 such as a mouse or keyboard. The display 107 and the user controls 106 may be components of the second electronic device, or may be connected to the second electronic device using wired or wireless connections.

When the user initiates a device configuration process, the device configuration application can request that the first electronic device 101 search for available wireless communication systems 103, including secured and unsecured communication systems. The wireless communication systems may be network connections (e.g., 802.11 wireless connections) with access controlled by a wireless communication access device 102 (such as a home WiFi router), or may be individual connections controlled by a configured wireless communication device 104 (such as a Bluetooth pairing or an ad-hoc WiFi network).

The device configuration application on the second electronic device 105 can display a list of available wireless communication systems 103 to the user via the display 107, and can enable the user to select a particular wireless communication system 103 for which they would like to configure a connection. If the selected wireless communication system 103 requires configuration of security parameters, the device configuration application can display appropriate information on the display 107. The user can then indicate the appropriate values using the user controls 106. Once the user enters the required values, the device configuration application transmits the values to the first electronic device 101 via the wired communication system 108. The first electronic device 101 then stores the values in a non-volatile memory and then utilizes these values to connect to the selected wireless communication system 103. The first electronic device 101 may optionally return status information regarding the connection to the second wireless communication system 103 to the second electronic device 105 via the wired communication system 108.

This method has the disadvantage that it requires a physical connection between the second electronic device 105 and the first electronic device 101, which may require temporary relocation of the first electronic device 101 and it also requires an additional cable that must be included with the first electronic device 101 that increases the product cost. In addition, the user must retain and later locate this additional cable if configuration information for the wireless communication system 103 needs to be updated or it is desired to configure a connection between the first electronic device 101 and a different wireless communication system.

FIG. 2 shows a second prior art method of configuring a first electronic device 201 for connection to a wireless communication system 203 by using a second electronic device 205 (e.g. smart phone) having associated user controls 206 and display 207. In this method, the first electronic device 201 must initially be put into a configuration state

200. Typically, this is the standard state for the first electronic device 201 when it is shipped from the factory. If the user wishes to reconfigure the first electronic device 201, the user may press a reset button on the first electronic device 201 that erases any previous security information and puts the device back into the configuration state 200.

When the first electronic device 201 is in the configuration state 200, the first electronic device 201 is configured to operate as a temporary wireless communication access device 212 and makes available a temporary wireless communication system 213, which is typically accessible without any security authorization required. The user then uses a user interface on the second electronic device 205 to connect the second electronic device 205 to the temporary wireless communication system 213. The user interface makes use of the user controls 206 and the display 207 associated with the second electronic device 205. This is typically done using network setup software that was previously installed on the second electronic device 205. Once the second electronic device 205 is connected to the temporary wireless communication system 213, the user utilizes an application stored on the second electronic device 205 to specify the security settings required to access a wireless communication system 203. These security settings are transferred from the second electronic device 205 to the first electronic device 201 via the temporary wireless communication system 213 and are stored on the first electronic device 201.

Once the security settings have been transmitted and stored on the first electronic device 201, the first electronic device 201 is reconfigured to operate in a connection state 210. In the connection state 210, the first electronic device 201 attempts to connect to the wireless communication system 203 using the stored security settings. The user must also reconfigure the second electronic device 205 to disconnect from the temporary wireless communication system 213. Typically, the second electronic device 205 will then connect to the wireless communication system 203, and will attempt to communicate with the first electronic device 201 via the wireless communication system 203 to verify that the connection has been properly established. Once the connection has been established, the first electronic device 201 can communication with other devices such as wireless communication access device 202 (such as a home WiFi router) or configured wireless communication device 204 (such as a Bluetooth pairing or an ad-hoc WiFi network).

The method of FIG. 2 has the disadvantage that the sequence of events required to establish the connection between the first electronic device 201 and the wireless communication system 203 is complex and can cause confusion for the user. Reconfiguring the second electronic device 205 to connect to the temporary wireless communication system 213 is not an operation most users are comfortable with. In addition, since the first electronic device 201 cannot connect to both the temporary wireless communication system 213 and the wireless communication system 203 at the same time, the user may be required to type information (e.g., a network name) that could be displayed to the user for selection using other methods. This can lead to errors in typing which will prevent the user from being successful. Furthermore, this method typically takes more user time than other methods because of the need to connect to the temporary wireless communication system 213 and then also the wireless communication system 203. Finally, this dual wireless communication systems approach does not provide an effective mechanism for error handling if any problems arise. When the first electronic device 201 is attempting to connect to the wireless communication system 203, it cannot communicate with the second electronic device 205 unless it is successful in establishing the connection.

U.S. Patent Application Publication 2011/0243033 to Won, entitled "Apparatus and method for automatic access in a wireless communication system," describes a third method for connecting an electronic device to a wireless communication system by utilizing a physical or virtual push button on both the electronic device and on a wireless communication access device that controls the wireless communication system. This method has the disadvantage that it may require the user to replace their existing wireless communication access device with a new wireless communication access device that supports this configuration method. Furthermore, this method has security issues related to the ability to crack into the wireless network and gain access to other secured devices via an automated computer program that communicates with the wireless communication access device.

U.S. Patent Application Publication 2010/0253507 to Jung et al., entitled "Wireless device with an aggregate user interface for controlling other devices," discloses a system that makes a determination that a wireless device is in proximity to a secondary wireless device and provides an aggregate user interface on the wireless device. Commands are sent to the secondary wireless device via the aggregate user interface to transition the secondary wireless device between different states.

There remains a need for a convenient and reliable method to connect an electronic device without user interface components to a wireless communication system.

SUMMARY OF THE INVENTION

The present invention represents a method for configuring a first electronic device, the first electronic device including first and second wireless communication systems, comprising:

establishing a first wireless connection between the first electronic device and a second electronic device using the first wireless communication system;

transmitting configuration information pertaining to the second wireless communication system from the first electronic device to the second electronic device using the first wireless connection;

receiving configuration instructions on the first electronic device transmitted by the second electronic device over the first wireless connection; and using the configuration instructions to configure the first electronic device to communicate using the second wireless communication system.

This invention has the advantage that the first electronic device does not need to include user interface components to establish a wireless connection using the second wireless communication system.

It has the additional advantage that the first electronic device can be configured using a second electronic device to which many users will commonly have access.

It has the further advantage that the process of configuring the first electronic device is simple and does not require establishing a physical connection to the second electronic device.

It has the further advantage that the second electronic device does not necessarily need to include hardware or software to support the second wireless communication system or any advanced security features that may be associated with the second wireless communication system.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 3:
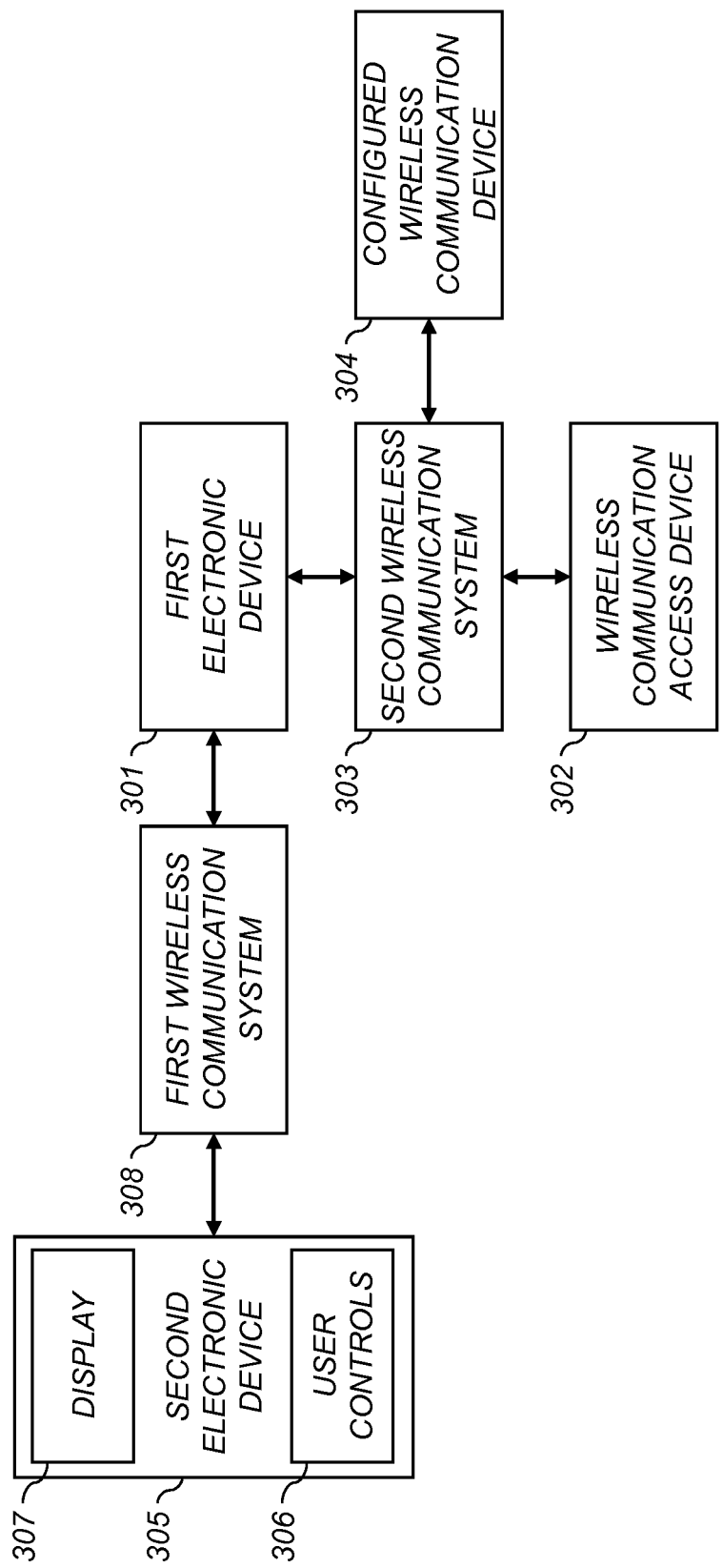
FIG. 3 is a high-level diagram showing components used in a method of configuring an electronic device for connection to a wireless communication system according to an embodiment of the present invention.

The present invention will now be described with reference to FIG. 3, is a high-level diagram showing components used in a method of configuring a first electronic device 301 for connection to a second wireless communication system 303. In some embodiments, the first electronic device 301 is an electronic device that does not include user interface components that would be needed to directly configure the connection to the second wireless communication system 303. The method involves utilizing a first wireless communication system 308 to establish a connection to a second electronic device 305 that has associated user interface components including user controls 306 and display 307. The user controls 306 can include components such as a keyboard, a keypad, or a pointing device (e.g., a mouse, a track pad or a joystick). The user controls 306 for the second electronic device 305 are used to provide configuration information to be sent from the second electronic device 305 to the first electronic device 301 using the first wireless communication system 308. The first electronic device 301 then uses the received configuration information to establish a second wireless connection to a wireless communication access device 302 or a configured wireless communication device 304 using the second wireless communication system 303.

In some embodiments, the second electronic device 305 is a device, such as a smart phone or tablet computer, having integrated user interface components. For example, the second electronic device 305 may include a keyboard or various buttons that serve as user controls 306. In some configurations, the display 307 can be a touch sensitive display screen that provides the user controls 306 as virtual touch sensitive buttons.

In other embodiments, the second electronic device 305 may be a device, such as a personal computer, where the user controls 306 or display 307 are provided as separate system components that are connected to the second electronic device 305 using wired or wireless connections.

The second electronic device 305 has the capability to connect to a first wireless communication system 308 by way of hardware and software associated with in the second electronic device 305. The first electronic device 301 also has the capability to connect to the first wireless communication system 308 by way of hardware and software included in the first electronic device 301.

In a preferred embodiment, the first wireless communication system 308 uses a protocol, such as Bluetooth or Near Field Communications, that does not require user configuration for security, or requires configuration for security that is substantially simpler than the configuration required for the second wireless communication system 303. As an example, the first wireless communication system 308 may require that the first electronic device 301 and the second electronic device 305 be paired to communicate with each other. This pairing may be allowed with the same security code each time, or may not require a security code. In this scenario, the display 307 associated with the second electronic device 305 can display specific instructions to the user to simplify the connection process.

In some embodiments, the first wireless communication system 308 may be a private or semi-private protocol using some other form of wireless communications. In other embodiments, the first wireless communication system 308 may be a secured wireless communication system to which both the first electronic device 301 and the second electronic device 305 are authorized and able to communicate.

Figure 4:
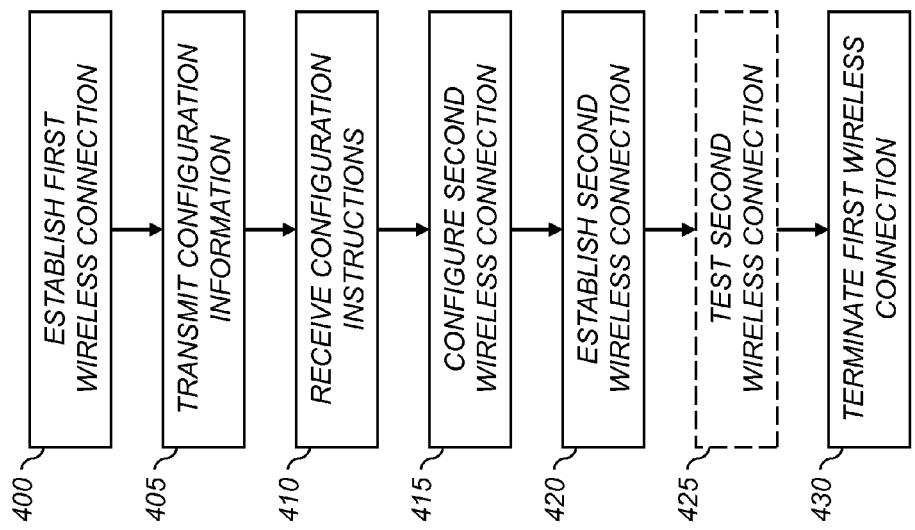
FIG. 4 is a flow chart of a method for establishing a wireless connection in accordance with the present invention.

FIG. 4 shows a flow chart summarizing a method for configuring the first electronic device 301 (FIG. 3) in accordance with the present invention. In a preferred embodiment, this method is performed by running application software loaded on the second electronic device 305 (FIG. 3). A companion software application is stored in a program memory in the first electronic device 301 and is executed on a data processing system in the first electronic device.

In some embodiments, the second electronic device 305 is a portable electronic device such as a smart phone or a tablet computer, and the application software is an "app" that is downloaded to the second electronic device 305 from the internet. In other embodiments, the second electronic device 305 is a desktop computer, and the application software is loaded onto the second electronic device 305 from the internet or from a digital storage medium such as a CDROM.

The application software performs an establish first wireless connection step 400 to establish a first wireless connection between the first electronic device 301 and the second electronic device 305 using the first wireless communication system 308 (FIG. 3). As required by the protocol on the first wireless communication system 308, the user may be prompted to perform an action such as selecting the first electronic device 301 from a list of available devices, or entering a pairing code associated with the first electronic device 301.

As a further security measure, in some embodiments the first electronic device 301 may be configured so that communication over the first wireless communication system 308 is only enabled for a short period of time following a specified user action. For example, that action could be powering on the first electronic device 301 for the first time, pressing a physical "configure connection" button on the first electronic device 301 or performing a factory reset of the first electronic device 301.

Once the first wireless connection is established between the first electronic device 301 and the second electronic device 305, a transmit configuration information step 405 is used to transmit configuration information pertaining to the second wireless communication system 303 from the first electronic device 301 to the second electronic device 305 using the first wireless connection.

In a preferred embodiment, the transmit configuration information step 405 is initiated when the application software running on the second electronic device 305 sends a query to the first electronic device 301. In response, software running on the first electronic device 301 transmits the requested configuration information back to the second electronic device 305. The configuration information can include, for example, a list of wireless networks that are available for connection using the second wireless communication system 303, together with security settings associated with each of the available networks.

For the case where the second wireless communication system 303 is a secured WiFi network, the second electronic device 305 can send a command to the first electronic device 301 requesting a list of available WiFi networks that can be detected. In response to this request, the first electronic device 301 can utilize conventional methods to identify available WiFi networks, including listening for broadcasts from wireless communication access devices 302 that control access to various WiFi networks. The first electronic device 301 can then send a response to the second electronic device 305 with a list of the WiFi networks that are available, together with other appropriate information such as security settings associated with the detected WiFi networks.

In some embodiments, the first electronic device 301 can also return configuration information relating to WiFi networks that were previously detected, even if that network cannot be found presently. This method can give the user a perception of faster system performance. In some embodiments, the first electronic device 301 may periodically transmit updated configuration information to the second electronic device 305 as new WiFi networks are discovered or when previously detected WiFi networks are no longer available. This update may be accomplished in response to the first request made by the second electronic device 305, or in response to repeated polling for configuration information from the second electronic device 305.

In a preferred embodiment, after receiving the configuration information transmitted in the transmit configuration information step 405, the second electronic device 305 then displays a list of available networks on the display 307. The user can then indicate a selection of a particular network from the displayed list using the user controls 306. In some embodiments, user controls 306 may be provided to enable the user to indicate that the network they are looking for is not shown, or to specify information that can be used to identify the desired network, such as the network name.

In some embodiments, the second electronic device 305 may transmit a request to the first electronic device 301 asking for additional configuration information about the particular network that was selected by the user. The first electronic device 101 can then communicate with the wireless communication access device 302 that controls access to the selected WiFi network to determine the requested information. For example, the wireless communication access device 302 may be asked to supply information such as whether a security code is required, and if so what security mechanism is utilized by the wireless communication access device 302 (e.g. WEP, WPA, WPA2). The first electronic device 301 can then return that information to the second electronic device 305. The second electronic device 305 can then present appropriate options to the user on the display 307 based upon the configuration information that was returned.

For example, if the returned configuration information indicates that no security code is required for connection to the selected WiFi network, the second electronic device 305 may present no user interface and can proceed to send configuration instructions to the first electronic device 301 via the first wireless communication system 308 instructing it to attempt to connect to the selected WiFi network.

Alternatively, if a security code is required for the selected WiFi network, the second electronic device 305 can display a combination of information and controls to the user via the display 307 to enable the user to enter a security code for access to the selected WiFi network. Furthermore, the second electronic device 305 may perform some first level validation of the security code entered by the user to ensure it conforms to the requirements for the specified security settings. The second electronic device 305 can then proceed to send appropriate configuration instructions, including the network identification information and the entered security code to the first electronic device 301 via the first wireless communication system 308, instructing it to attempt to connect to the selected WiFi network.

In some embodiments, the second electronic device 305 can include wireless communication components that enable it to communicate over the second wireless communication system 303. For example, the second electronic device 305 may be a handheld electronic device having a WiFi communication capability. If the second electronic device 305 has been connected to the second wireless communication system 303 at some point, the second electronic device 305 may already have configuration instructions for the second wireless communication system 303 stored in its memory. In this case, the application software running on the second electronic device 305 can provide the previously stored configuration instructions to the first electronic device rather than prompting the user to reenter any associated information (e.g., the security code).

Continuing with a discussion of FIG. 4, the first electronic device 301 receives the configuration instructions transmitted by the second electronic device 305 using a receive configuration instructions step 410. The first electronic device 301 then performs a configure second wireless connection step 415 to configure the first electronic device 301 to communicate using the second wireless communication system 303. This step will generally include storing information included in the received configuration instructions (such as the selected network and any associated security codes) in long term memory where it can be utilized to establish a connection to the selected network and will also be available at a future time to reconnect to the network should the network connection be lost.

An establish second wireless connection step 420 uses the configuration instructions to attempt to connect to the second wireless communication system 303 via the wireless communication access device 302. The first electronic device 301 may receive connection status information from the wireless communication access device 302, including connection progress, whether any connection errors were detected (e.g., invalid security code, or inability to communicate with the device) and whether the connection was successfully established. Preferably, the first electronic device 301 returns status information to the second electronic device 305 so that the status can be presented to the user on the display 307. The status information may include any connection status information returned from the wireless communication access device 302 to the first electronic device 301, as well as additional status information generated by the first electronic device 301.

Once the first electronic device 301 is connected to the second wireless communication system 303, the first electronic device 301 may optionally perform a test second wireless connection step 425, in which one or more connection tests are performed. The connection test will generally involve communicating with other devices or services via the second wireless communication system 303. The first electronic device 301 may pass the results of the connection tests back to the second electronic device 305, where the results can be displayed on the display 307 as a further indication to the user regarding whether the complete communication system was successfully established.

In some embodiments, the first electronic device 301 may communicate directly with one or more configured wireless communication devices 304 instead of with a wireless communication access device 302 to establish a secured connection between the devices. In such embodiments, second wireless communication system 303 may be unprotected and the first electronic device 301 and the configured wireless communication device 304 may utilize some form of data encryption to protect the data and communications between the first electronic device 301 and the configured wireless communication device 304. In this embodiment, the configuration of the first electronic device 301 may include entering security codes for data encryption between the first electronic device 301 and the configured wireless communication device 304.

Once the first electronic device 301 is properly configured, the communication connection between the first electronic device 301 and the second electronic device 305 via the first wireless communication system 308 is no longer required, and can be terminated using a terminate first wireless connection step 430.

In some embodiments, the first electronic device 301 can then enter a different state where it no longer accepts communication via the first wireless communication system 308 in order to provide a higher level of security. In such cases, the first electronic device 301 may have some mechanism to re-enable connection to the first wireless communication system 308 so that updated configuration instructions can be provided. This may be indicated by any of a number or combination of events including, but not limited to, a factory reset, a push button on the first electronic device 301, a virtual push button on the first electronic device 301 including a capacitive change sensor, some communication from another device or service via the second wireless communication system 303, or a power cycle of the first electronic device 301, or a combination of two or more specified events occurring within a certain time period.

Figure 5:
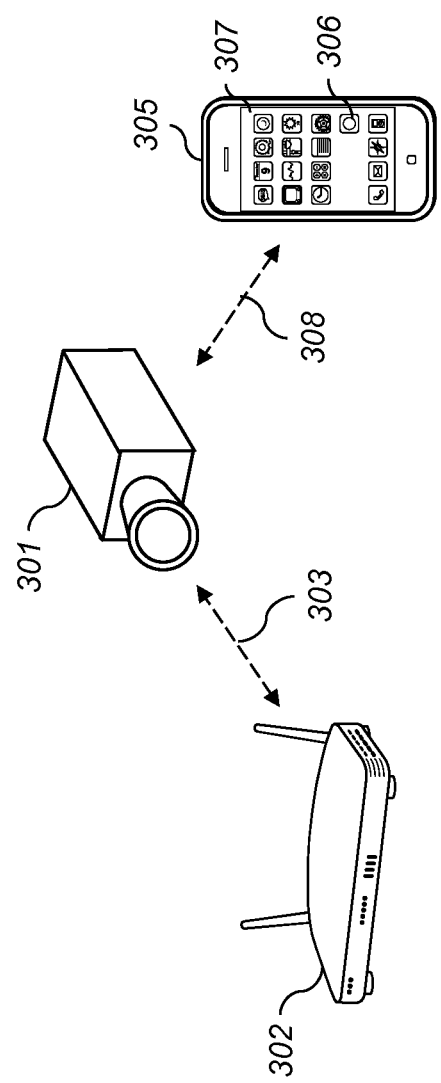
FIG. 5 is a diagram of a security camera system that implements the method of the present invention.

The method of the present invention can be applied to many different applications including a wide variety of different types of electronic devices. It is particularly appropriate for use with electronic devices that do not include any user interface components, or include only very limited user controls. FIG. 5 shows an example of one such application in which the first electronic device 301 is a wireless-enabled security camera system that includes a digital camera module capable of capturing a digital video (i.e., a time sequence of digital images). The wireless-enabled security camera system is equipped with the wireless communication components necessary to establish connections using both first wireless communication system 308 and second wireless communication system 303. For example, the first wireless communication system 308 can be a Bluetooth communication system which can be used to communicate with a second electronic device 305 such as a smart phone. In this example, the second electronic device 305 includes display 307, which is a touch screen that is used to provide touch sensitive user controls 306. As described relative to FIGS. 3 and 4, the first wireless communication system 308 is used to provide configuration instructions to the first electronic device 301 to enable it to establish communication over second wireless communication system 303 (e.g., a WiFi communication system) via a wireless communication access device 302 (e.g., a WiFi wireless router). Once the first electronic device 301 has been configured for connection to the second wireless communication system 303, the connection to the second electronic device 305 using the first wireless communication system 308 can be terminated. The first electronic device 301 can them continue to communicate with other electronic devices or systems using the second wireless communication system 303. For example, the wireless-enabled security camera system can send a stream of captured video images to a server or some other type of image receiving system where they can be viewed in real time or stored for later viewing.

It will be obvious to one skilled in the art that the method of the present invention can be applied to many other types of electronic devices as well, including other types of security system components, thermostats, remote controls, appliances, and digital printers and scanners.

This invention has the advantages that it can leverage an existing second electronic device 305 that the user already owns, such as a smart phone, or a tablet computer, to act as a virtual display and to provide virtual user controls for the first electronic device 301. This enables the cost of the first electronic device 301 to be reduced since it does not need to include such components. Furthermore, the method of the present invention can leverage existing wireless communication protocols supported by that second electronic device 305 that have simpler security issues than the second wireless communication system 303.

Figure 1:
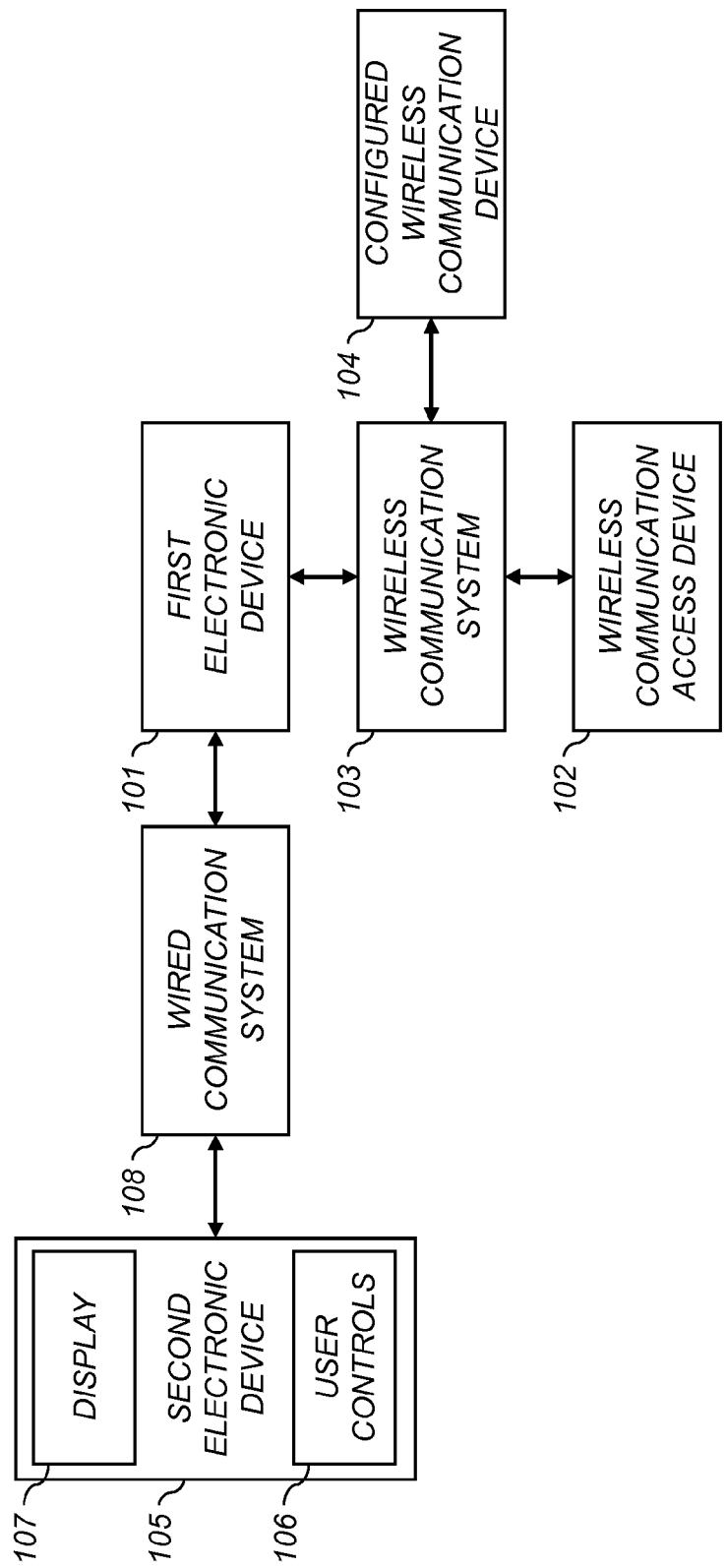
FIG. 1 is a high-level diagram showing components used in a first prior art method of configuring an electronic device for connection to a wireless communication system.
Figure 2:
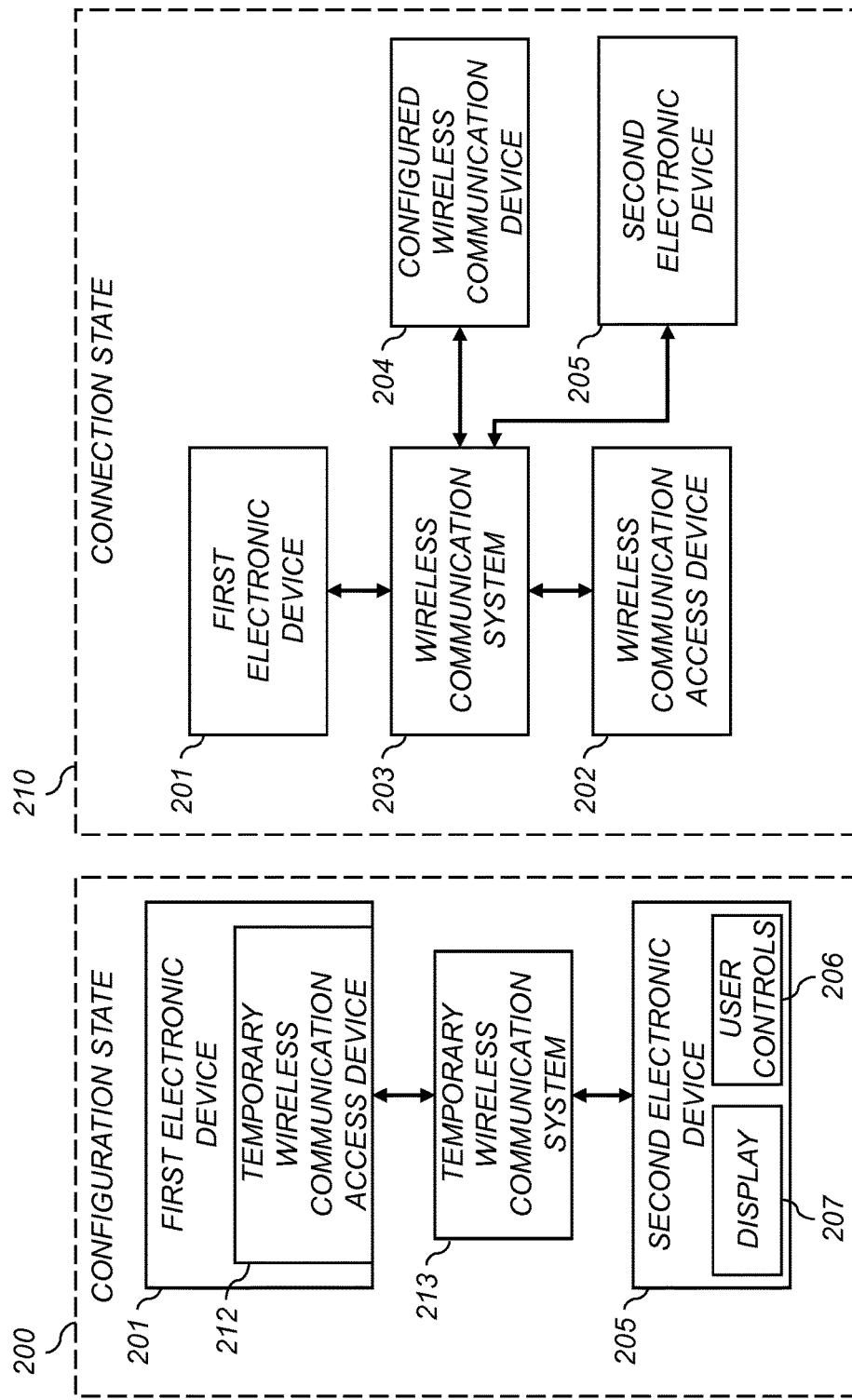
FIG. 2 is a high-level diagram showing components used in a second prior art method of configuring an electronic device for connection to a wireless communication system.

This invention is advantaged relative to the prior art solution shown in FIG. 1 in that it does not require relocation of the first electronic device 301 so that it can be physically connected to the second electronic device 305. Furthermore, since the first electronic device 301 does not require that a physical connector be provided to support a physical connection to the second electronic device 305, it is easier to seal the first electronic device 301 against weather and the elements for use in outdoor environments. It is also advantaged relative to the prior art solution shown in FIG. 2 in that it avoids the required complex user interactions.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 101 first electronic device
102 wireless communication access device
103 wireless communication system
104 configured wireless communication device
105 second electronic device
106 user controls
107 display
108 wired communication system
200 configuration state
201 first electronic device
202 wireless communication access device
203 wireless communication system
204 configured wireless communication device
205 second electronic device
206 user controls
207 display
210 connection state
212 temporary wireless communication access device
213 temporary wireless communication system
301 first electronic device
302 wireless communication access device
303 second wireless communication system
304 configured wireless communication device
305 second electronic device
306 user controls
307 display
308 first wireless communication system
400 establish first wireless connection step
405 transmit configuration information step
410 receive configuration instructions step
415 configure second wireless connection step
420 establish second wireless connection step
425 test second wireless connection step
430 terminate first wireless connection step

The invention claimed is:

1. A computer-implemented method for configuring an electronic device to join a wireless network, comprising:
    establishing, by a first electronic device, a first wireless connection with a second electronic device using a first wireless system and a first wireless communication protocol;
    receiving, by the first electronic device over the first wireless connection from the second electronic device, an indication of a second wireless system available to the first electronic device,
        wherein the second wireless system is selected at the second electronic device from a displayed plurality of available wireless communication systems,
        wherein the plurality of available wireless communication systems are displayed in response to establishing the first wireless connection, and
        wherein receiving the indication by the first electronic device comprises receiving configuration information comprising security credentials for joining the second wireless system;
    joining, by the first electronic device, the second wireless system using the configuration information by establishing a second wireless connection with a third electronic device using a second wireless communication protocol; and
    disabling, responsive to the joining, acceptance of a subsequent connection to the first wireless system.

2. The method of claim 1, further comprising terminating, by the first electronic device, the first wireless connection with the second electronic device after the second wireless connection with the third electronic device has been established.

3. The method of claim 2, further comprising power cycling the first electronic device to re-enable the first wireless connection with the second electronic device.

4. The method of claim 1, wherein joining to the second wireless system comprises receiving connection status information from the third device, and wherein the connection status information provides information regarding detection of connection errors with the third device.

5. The method of claim 4, wherein the connection errors include an invalid security credential, an indicator representing an inability of the first electronic device to communicate with the third device, or both.

6. The method of claim 1, further comprising establishing, by the first electronic device, a third wireless connection with a fourth electronic device connected to the second wireless system after establishing the second wireless connection with the third electronic device.

7. The method of claim 1, further comprising testing, by the first electronic device, the second wireless connection with the third electronic device to determine whether the first electronic device successfully joined the second wireless system.

8. The method of claim 1 wherein the second electronic device comprises a handheld electronic device.

9. The method of claim 1, wherein the configuration information received over the first wireless connection includes information that was previously stored in the second electronic device.

10. The method of claim 1, wherein the configuration information includes network identification information, and wherein the security credentials include a security key.

11. The method of claim 1, further comprising:
after the disabling, re-enabling acceptance of subsequent connections to the first wireless system based at least in part on activation of a virtual push button or a physical button push on the first electronic device.

12. The method of claim 1, wherein the second wireless system is selected based on an input received by the second wireless device from a user of the second wireless device.

13. A non-transitory computer program storage device comprising a non-transitory tangible computer readable storage medium that stores instructions when executed by at least one processor causes a first electronic device to:
establish a first wireless connection with a second electronic device before gaining access to a second wireless network, wherein the first wireless connection is associated with a first wireless network using a first wireless system and a first communication protocol;
receive over the first wireless connection from the second electronic device, an indication of a second wireless system available to the first electronic device,
wherein the second wireless system is selected at the second electronic device from a displayed plurality of available wireless communication systems,
wherein the plurality of available wireless communication systems are displayed in response to establishing the first wireless connection, and
wherein receiving the indication by the first electronic device comprises receiving configuration information that includes wireless access credentials for gaining access to the second wireless network;
establish a second wireless connection with a third electronic device using a second communication protocol associated with the second wireless network;
gain access to the second wireless network based at least in part on the wireless access credentials satisfying a security configuration of the second wireless network; and
disable, responsive to gaining access, acceptance of a subsequent connection to the first wireless system.

14. The non-transitory computer program storage device of claim 13, wherein the instructions when executed by at least one processor cause the first electronic device to gain access to the second wireless network comprise instructions that cause the first electronic device to receive connection status information from the third electronic device regarding whether the first electronic device is successful in joining the second wireless network.

15. The non-transitory computer program storage device of claim 13, wherein the instructions further cause the first electronic device to:
test the second wireless connection between the first electronic device and the third electronic device; and
determine whether joining the second wireless network is successful based on the test.

16. The non-transitory computer program storage device of claim 13, wherein the configuration information received from the second electronic device includes information that was previously stored in the second electronic device when the second electronic device previously gained access the second wireless network.

17. A wireless device comprising:
at least one processor;
a computer-readable memory communicatively coupled to the at least one processor and including instructions that when executed by the at least one processor, cause the wireless device to:
establish a first wireless connection over a first wireless system with a second wireless device using a first wireless protocol;
obtain an input to connect the second wireless device to a second wireless system from a plurality of available wireless systems,
wherein the second wireless system is selected at the second wireless device from a displayed plurality of available wireless communication systems and
wherein the plurality of available wireless communication systems are displayed in response to establishing the first wireless connection;
obtain a security credential for joining the second wireless system;
transmit over the first wireless connection the security credential to the second wireless device; and
disable, responsive to the transmitting, acceptance of a subsequent connection to the first wireless system.

18. The wireless device of claim 17, further comprising a display and a user control, wherein the instructions to obtain an input comprise instructions that cause the wireless device to:
produce a visual list of the plurality of available wireless systems on the display; and
receive the input from the user control based on the visual list of the plurality of available wireless systems.

19. The wireless device of claim 17, wherein the security credential was previously stored in the computer-readable memory.

20. The wireless device of claim 17, wherein the instructions further cause the wireless device to terminate the first wireless connection with the second wireless device after the second wireless device joins the second wireless system.

* * * * *